United States Patent
Kobayashi et al.

(10) Patent No.: US 9,394,595 B2
(45) Date of Patent: *Jul. 19, 2016

(54) HIGH CARBON THIN STEEL SHEET AND METHOD FOR PRODUCING SAME

(75) Inventors: Takashi Kobayashi, Kawasaki (JP); Nobuyuki Nakamura, Fukuyama (JP); Yoshimasa Funakawa, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 166 days.

This patent is subject to a terminal disclaimer.

(21) Appl. No.: 14/117,757

(22) PCT Filed: May 16, 2012

(86) PCT No.: PCT/JP2012/003193
§ 371 (c)(1),
(2), (4) Date: Nov. 14, 2013

(87) PCT Pub. No.: WO2012/157267
PCT Pub. Date: Nov. 22, 2012

(65) Prior Publication Data
US 2014/0069556 A1     Mar. 13, 2014

(30) Foreign Application Priority Data
May 18, 2011   (JP) ................ 2011-110917

(51) Int. Cl.

| | |
|---|---|
| C22C 38/44 | (2006.01) |
| C22C 38/40 | (2006.01) |
| C21D 6/00 | (2006.01) |
| C21D 9/46 | (2006.01) |
| C21D 1/42 | (2006.01) |
| C21D 1/667 | (2006.01) |
| C22C 38/00 | (2006.01) |
| C22C 38/02 | (2006.01) |
| C22C 38/04 | (2006.01) |
| C22C 38/06 | (2006.01) |
| C21D 8/02 | (2006.01) |
| C22C 38/14 | (2006.01) |
| C22C 38/18 | (2006.01) |
| C21D 1/32 | (2006.01) |

(52) U.S. Cl.
CPC . *C22C 38/44* (2013.01); *C21D 1/32* (2013.01); *C21D 1/42* (2013.01); *C21D 1/667* (2013.01); *C21D 6/00* (2013.01); *C21D 8/0226* (2013.01); *C21D 8/0263* (2013.01); *C21D 9/46* (2013.01); *C22C 38/001* (2013.01); *C22C 38/02* (2013.01); *C22C 38/04* (2013.01); *C22C 38/06* (2013.01); *C22C 38/14* (2013.01); *C22C 38/18* (2013.01); *C22C 38/40* (2013.01); *C21D 2211/003* (2013.01); *C21D 2211/005* (2013.01); *Y02P 10/253* (2015.11)

(58) Field of Classification Search
CPC ........ C22C 38/44; C22C 38/18; C22C 38/14; C21D 2211/003; C21D 2211/005
See application file for complete search history.

(56) References Cited

U.S. PATENT DOCUMENTS

2005/0199322 A1    9/2005   Nakamura

FOREIGN PATENT DOCUMENTS

| JP | H 04-214839 A | 8/1992 |
|---|---|---|
| JP | 11-080884 | 3/1999 |
| JP | 2003-073742 A | 3/2003 |
| JP | 2005-344197 A | 12/2005 |
| JP | 2007-9293 A | 1/2007 |
| JP | 2007-262487 A | 10/2007 |
| JP | 2009-149924 A | 7/2009 |
| JP | 2010-100896 A | 5/2010 |
| WO | WO 2007/015541 A1 | 2/2007 |
| WO | WO 2011/089845 A1 | 7/2011 |

OTHER PUBLICATIONS

Supplementary European Search Report dated Nov. 3, 2014, application No. EP 12 78 6082.
International Search Report dated Aug. 21, 2012, application No. PCT/JP2012/003193.

*Primary Examiner* — Rebecca Lee
(74) *Attorney, Agent, or Firm* — RatnerPrestia

(57) ABSTRACT

A high carbon steel sheet having a chemical composition containing C: 0.20% to 0.50%, Si: 1.0% or less, Mn: 2.0% or less, P: 0.03% or less, S: 0.02% or less, sol. Al: 0.08% or less, N: 0.02% or less, and the remainder composed of Fe and incidental impurities, on a percent by mass basis, and a microstructure composed of ferrite and cementite, wherein the fraction of pro-eutectoid ferrite, among the ferrite, in the whole steel microstructure is 20% or more and less than 50%, the average grain size dc of the cementite in the region from the position at one-quarter of the sheet thickness of the steel sheet to the sheet thickness center is 0.50 to 1.5 μm, and the average grain size ds of the cementite in the region from the surface of the steel sheet to the position at one-quarter of the sheet thickness satisfies ds/dc≤0.8.

7 Claims, No Drawings

HIGH CARBON THIN STEEL SHEET AND METHOD FOR PRODUCING SAME

CROSS REFERENCE TO RELATED APPLICATIONS

This is the U.S. National Phase application of PCT/JP2012/003193, filed May 16, 2012, which claims priority to Japanese Patent Application No. 2011-110917, filed May 18, 2011, the disclosures of these applications being incorporated herein by reference in their entirety for all purposes.

TECHNICAL FIELD OF THE INVENTION

The present invention relates to a high carbon steel sheet, in particular a high carbon steel sheet containing 0.20 to 0.50 percent by mass of C and having excellent formability and induction hardenability, and a method for manufacturing the same.

BACKGROUND OF THE INVENTION

In many cases, high carbon steel sheets used for machine structural parts and the like are formed into various shapes and, thereafter, are subjected to a heat treatment for enhancing hardness. Among them, a high carbon steel sheet which contains 0.2 to 0.5 percent by mass of C and in which carbides (cementite) have been subjected to spheroidizing is relatively mild, has excellent formability and, therefore, has been used frequently as a raw material of sheet metal for automobile driving system parts and the like. As for automobile driving system parts which are mass-produced, induction hardening having excellent productivity is suitable for a heat treatment to enhance hardness of parts after forming. Consequently, a high carbon steel sheet having excellent induction hardenability in addition to the formability has been required as a raw material for automobile driving system parts, and various technologies have been proposed previously.

For example, Patent Literature 1 discloses a high carbon steel sheet which is made from hypo-eutectoid steel containing C: 0.1 to 0.8 percent by mass and S: 0.01 percent by mass or less and which has excellent local ductility and hardenability, wherein cementite is dispersed in ferrite in such a way that the spheroidizing ratio becomes 90% or more and the cementite average grain size is 0.4 to 1.0 µm.

Also, Patent Literature 2 proposes a method for manufacturing a high-hardenability high-carbon hot rolled steel sheet by subjecting a steel containing 0.2 to 0.7 percent by mass of C to hot rolling to control the microstructure in such a way as to include more than 20% of bainitic phase on a volume ratio basis and, thereafter, performing annealing in such a way that cementite is spheroidized in the microstructure.

Furthermore, Patent Literature 3 discloses a high carbon steel sheet having excellent hardenability and stretch flangeability, characterized by being made from a steel containing C: 0.22 to 0.45 percent by mass, Cr: 0.01 to 0.70 percent by mass, Ti: 0.005 to 0.050 percent by mass, and B: 0.0003 to 0.0050 percent by mass, wherein the cementite average grain size is 0.1 to 1.0 µm and the ratio of cementite grain size standard deviation/cementite average grain size is 1.0 or less.

PATENT LITERATURE

[PTL 1] Japanese Unexamined Patent Application Publication No. 11-80884
[PTL 2] Japanese Unexamined Patent Application Publication No. 2003-73742
[PTL 3] Japanese Unexamined Patent Application Publication No. 2005-344197

SUMMARY OF THE INVENTION

These related arts have problems as described below.

In order to obtain the medium or high carbon steel sheet described in Patent Literature 1, three-step annealing including a combination of holding in specific temperature ranges just below and just above the $Ac_1$ transformation point is necessary. Consequently, the temperature control during annealing is complicated and characteristics of a finally obtained steel sheet become nonuniform easily, so that excellent formability and induction hardenability are not obtained stably.

The essence of the technology described in Patent Literature 2 is that a large amount of bainite is contained in the microstructure of the hot rolled steel sheet before annealing, and quenching at a cooling rate of more than 120° C./sec is necessary in a large temperature range after hot rolling. Therefore, execution is not possible unless equipment having very high cooling capacity is available and, in addition, characteristics of the resulting steel sheet also become nonuniform easily because cooling variations exert an influence easily. Consequently, excellent formability and induction hardenability are not obtained stably.

The steel sheet described in Patent Literature 3 necessarily contains Ti and Cr in addition to B to ensure the hardenability. It is not possible to apply this technology to wide-ranging steel species, and also, excellent formability and induction hardenability are not obtained stably.

The present invention provides a high carbon steel sheet containing 0.20 to 0.50 percent by mass of C and having excellent formability and induction hardenability stably and a method for manufacturing the same.

The present inventors performed intensive research on the above-described high carbon steel sheet and, as a result, found the following.

i) Excellent formability and induction hardenability are obtained stably by allowing a microstructure to be composed of ferrite and cementite and controlling the fraction of pro-eutectoid ferrite in the whole steel microstructure, the cementite grain size, and the distribution thereof in the sheet thickness direction.

ii) For that purpose, it is effective that, in cooling of the steel sheet after hot rolling, cooling is performed with two-step cooling pattern, in which a high temperature zone is cooled gradually and, subsequently, strong cooling is performed for a short time.

The present invention has been made on the basis of the above-described findings and provides a high carbon steel sheet characterized by having a chemical composition containing C: 0.20% to 0.50%, Si: 1.0% or less, Mn: 2.0% or less, P: 0.03% or less, S: 0.02% or less, sol.Al: 0.08% or less, N: 0.02% or less, and the remainder composed of Fe and incidental impurities, on a percent by mass basis, and a microstructure composed of ferrite and cementite, wherein the fraction of pro-eutectoid ferrite, among the above-described ferrite, in the whole steel microstructure is 20% or more and less than 50%, the average grain size dc of the above-described cementite in the region from the position at one-quarter of the sheet thickness of the steel sheet to the sheet thickness center is 0.50 to 1.5 µm, and the average grain size ds of the above-described cementite in the region from the surface of the steel sheet to the position at one-quarter of the sheet thickness satisfies ds/dc≤0.8.

The high carbon steel sheet according to the present invention can further contain at least one selected from the group consisting of Cr: 0.1% to 1.5%, Mo: 0.1% to 0.5%, Ni: 0.1% to 1.0%, Ti: 0.01% to 0.05%, Nb: 0.01% to 0.05%, V: 0.01% to 0.05%, and B: 0.0005% to 0.0050% on a percent by mass basis in addition to the above-described chemical composition.

Preferably, the above-described Si content is 0.1% or more and 0.5% or less.

Preferably, the above-described Mn content is 0.2% or more and 1.0% or less.

Preferably, the above-described ds/dc is 0.7 or more and 0.8 or less.

Preferably, the above-described high carbon steel sheet has a Rockwell hardness (HRB) after annealing of 85 or less. Preferably, the above-described high carbon steel sheet has a Rockwell hardness (HRC) after induction hardening of 40 or more.

The high carbon steel sheet according to the present invention can be produced by hot-rolling a steel slab having the above-described chemical composition at a finishing temperature higher than or equal to the $Ar_3$ transformation point, then performing primary cooling to a primary cooling stop temperature of 550° C. to 650° C. at an average cooling rate of 25° C./sec to 50° C./sec, then performing secondary cooling to a secondary cooling stop temperature of 500° C. to 600° C. at an average cooling rate of 120° C./sec or more for a cooling time of 1 s or less, performing coiling, and then performing annealing at an annealing temperature of 650° C. or higher and lower than or equal to the $Ac_1$ transformation point.

According to the present invention, it becomes possible to produce a high carbon steel sheet containing 0.20 to 0.50 percent by mass of C and having excellent formability and induction hardenability stably.

DESCRIPTION OF EMBODIMENTS OF THE INVENTION

The reasons for limiting the high carbon steel sheet according to the present invention and the method for manufacturing the same will be described below in detail.

(1) Chemical Composition

Hereafter, the unit % of the content of component element refers to percent by mass.

C: 0.20% to 0.50%

Carbon is an element indispensable for enhancing the strength after hardening. If the amount of C is less than 0.20%, the strength required of a machine structural part is not obtained. In addition, ferrite is generated easily during cooling after the hot rolling and the area fraction of the pro-eutectoid ferrite is not controlled within a predetermined range easily. On the other hand, if the amount of C is more than 0.50%, the steel sheet has excessively high strength after the annealing, the formability of the steel sheet is degraded and, in addition, embrittlement and a dimensional error of a part after hardening are caused. Therefore, the content of C is limited to 0.20% to 0.50%, and preferably 0.25% to 0.45%.

Si: 1.0% or Less

Silicon has a function of deoxidizing steel and a function of enhancing the resistance to temper softening after hardening. In order to obtain these functions, the Si content is preferably 0.1% or more. However, if Si is excessively contained, the strength of the steel sheet is excessively enhanced and the surface quality of the steel sheet is degraded, so that the Si content is limited to 1.0% or less, and preferably 0.5% or less.

Mn: 2.0% or Less

Manganese has a function of enhancing hardenability of the steel. In order to obtain this function, the content is specified to be preferably 0.2% or more, and the content is specified to be further preferably 0.3% or more. However, if Mn is excessively contained, significant degradation in the formability of the steel sheet is caused. Therefore, the content of Mn is limited to 2.0% or less, and preferably 1.0% or less.

P: 0.03% or Less

Phosphorus degrades the formability of the steel sheet and the toughness after the heat treatment. Therefore, the content of P is limited to 0.03% or less, and preferably 0.02% or less.

S: 0.02% or Less

Sulfur degrades the formability of the steel sheet and the toughness after the heat treatment. Therefore, the content of S is limited to 0.02% or less, and preferably 0.01% or less.

Sol.Al: 0.08% or Less

Aluminum is an element added for deoxidizing steel. However, addition of Al in such a way that the amount of sol.Al in the steel exceeds 0.08% causes an increase of inclusions and causes degradation in formability of the steel sheet. Therefore, the content of sol.Al is limited to 0.08% or less, and preferably 0.04% or less. Meanwhile, in the case where the steel sheet is held at a high temperature, AlN is formed in the steel, growth of austenite crystal grains during austenitization is suppressed, and the hardenability may be degraded. In particular, in the case where the steel sheet is held at a high temperature in a nitrogen atmosphere, the above-described influence becomes remarkable easily by N which enters the steel from the atmosphere. In order to avoid such degradation in hardenability resulting from formation of AlN, it is necessary that the amount of sol.Al be 0.08% or less, preferably less than 0.04%, and further preferably the amount of sol.Al is specified to be less than 0.01%.

N: 0.02% or Less

If a large amount of N is contained, AlN may be formed in the steel and, thereby, the hardenability may be degraded. Therefore, the content of N is limited to 0.02% or less, and preferably 0.01% or less.

The remainder is specified to be Fe and incidental impurities. However, in order to further improve the hardenability and/or the resistance to temper softening, at least one selected from the group consisting of Cr: 0.1% to 1.5%, Mo: 0.1% to 0.5%, Ni: 0.1% to 1.0%, Ti: 0.01% to 0.05%, Nb: 0.01% to 0.05%, V: 0.01% to 0.05%, and B: 0.0005% to 0.0050% can be further contained. At this time, if the contents are less than the lower limits of the individual elements, the effects thereof are small. Meanwhile, if the contents are more than the upper limits, an increase in the production cost is caused and, in addition, the formability of the steel sheet and/or the toughness after the heat treatment may be degraded.

(2) Microstructure

Phase Configuration: Ferrite and Cementite

The high carbon steel sheet according to an embodiment of the present invention has a microstructure composed of ferrite and cementite in order to ensure compatibility between good formability and hardenability. At this time, it is desirable that the cementite is specified to be spheroidized cementite and the spheroidizing ratio of the cementite is 80% or more. Here, the spheroidizing ratio of the cementite refers to the ratio of the number of cementite grains having an aspect ratio (major axis/minor axis) observed in a sheet thickness cross-section of the steel sheet of 3 or less to the number of all cementite grains.

Fraction of Pro-Eutectoid Ferrite in Whole Steel Microstructure: 20% or More and Less than 50%

The pro-eutectoid ferrite is a mild grain substantially not containing cementite in a crystal grain and contributes to an improvement in the formability of the steel sheet. If the fraction of pro-eutectoid ferrite in the whole steel microstructure is less than 20%, the effect thereof is insufficient. Meanwhile, if the area fraction of pro-eutectoid ferrite in the whole steel microstructure is 50% or more, second phases, e.g., pearlite and bainite, in the microstructure after the hot rolling are reduced, the distribution of cementite after the annealing becomes nonuniform, and the induction hardenability is degraded. Therefore, the fraction of pro-eutectoid ferrite in the whole steel microstructure is specified to be 20% or more and less than 50%. Here, the pro-eutectoid ferrite refers to ferrite which has been precipitated as a primary crystal during the cooling process after the hot rolling and which does not contain cementite substantially, that is, has a cementite fraction in a crystal grain of less than 1%.

Grain size of cementite and distribution thereof in sheet thickness direction: the average grain size dc of the cementite in the region from the position at one-quarter of the sheet thickness of the steel sheet to the sheet thickness center is 0.50 to 1.5 μm and the average grain size ds of the cementite in the region from the surface of the steel sheet to the position at one-quarter of the sheet thickness satisfy ds/dc≤0.8

The induction hardening is a heat treatment applied in the case where hardness is enhanced by utilizing a skin effect of the high-frequency induction heating and hardening the surface layer portion of the steel. In the induction heating, the temperature is raised sharply in a very short time, e.g., about several seconds. Therefore, finer cementite is desirable to facilitate re-formation of solid solution of C along with decomposition of cementite. However, finer cementite may lead to an enhancement of strength of the steel sheet and impairs the formability. Therefore, it is necessary that the average grain size ds of the cementite is made small in the steel sheet surface layer portion which is a main portion having hardness enhanced by the induction hardening, that is, in the region from the surface of the steel sheet to the position at one-quarter of the sheet thickness, and the average grain size dc of the cementite is not made excessively small in the sheet thickness central portion, that is, in the region from the position at one-quarter of the sheet thickness of the steel sheet to the sheet thickness center. From this point of view, dc is specified to be 0.50 to 1.5 μm, and ds is allowed to satisfy ds/dc≤0.8. Here, the average grain size of cementite refers to a value determined by determining a geometric mean value of the major axis and the minor axis of each of cementite grains observed in a sheet thickness cross-section of the steel sheet, and determining an arithmetic mean value of the resulting geometric mean values of all cementite grains observed.

(3) Production Condition

Hot Rolling Finishing Temperature: Higher than or Equal to $Ar_3$ Transformation Point As for the high carbon steel sheet according to an embodiment of the present invention, a steel slab having the above-described chemical composition is hot-rolled at a finishing temperature higher than or equal to the $Ar_3$ transformation point, so as to be made into a steel sheet having a predetermined sheet thickness. At this time, if the finishing temperature is lower than the $Ar_3$ transformation point, a nonuniform microstructure in which a rolling texture remains is formed, and the nonuniform microstructure is succeeded after the annealing, and the hardenability is degraded. Therefore, the finishing temperature is specified to be higher than or equal to the $Ar_3$ transformation point.

In this regard, the $Ar_3$ transformation point can be determined from, for example, an inflection point on the basis of a measurement of a heat shrinkage curve during the cooling process from an austenite temperature zone. Alternatively, it is also possible to roughly calculate from the contents of chemical components.

Primary Cooling after Hot Rolling: Cooling to Cooling Stop Temperature of 550° C. to 650° C. at Average Cooling Rate of 25° C./sec to 50° C./sec It is necessary that primary cooling to a cooling stop temperature of 550° C. to 650° C. at an average cooling rate of 25° C./sec to 50° C./sec be performed immediately after the hot rolling. This is because if the average cooling rate is less than 25° C./sec, a large amount of pro-eutectoid ferrite is produced, and if 50° C./sec is exceeded, a sufficient amount of pro-eutectoid ferrite is not obtained, so that it is not possible to obtain the above-described predetermined amount of pro-eutectoid ferrite. Meanwhile, if the cooling stop temperature is higher than 650° C., the microstructure after the hot rolling is coarsened easily, and a predetermined microstructure after the annealing is not obtained easily. If the temperature is lower than 550° C., hard phases, e.g., bainite and martensite, are generated, and the steel sheet becomes too strong, so that a coil shape during coiling and operability may be degraded, and the steel sheet shape becomes worse so that cooling variations may be caused.

If the stand-by time after the primary cooling up to start of the following secondary cooling is long, ferrite transformation proceeds and a large amount of pro-eutectoid ferrite is generated easily. In addition, the surface temperature of the steel sheet easily excessively increases again because of heat generation by transformation and recuperation from the inside of the steel sheet. Therefore, it is desirable that the time interval after the primary cooling up to start of the secondary cooling be 3 sec or less, and 1 sec or less is more desirable.

Secondary Cooling after Hot Rolling: Cooling to Cooling Stop Temperature of 500° C. to 600° C. at Average Cooling Rate of 120° C./Sec or More for Cooling Time of 1 Sec or Less The steel sheet after the primary cooling is cooled to a cooling stop temperature of 500° C. to 600° C. at an average cooling rate of 120° C./sec or more within 1 sec or less and is coiled.

In the case of cooling by common pouring of water, the temperature zone of 500° C. to 600° C. is a zone in which transition from film boiling to nucleate boiling starts, so that cooling variations in the steel sheet occur easily. In such a temperature zone, cooling variations in the steel sheet do not occur easily when accelerated water-cooling is performed under a nucleate boiling-dominated condition in such a way that the average cooling rate becomes 120° C./sec or more, and variations in the steel sheet characteristics can be reduced to a low level. The accelerated water-cooling at an average cooling rate of 240° C./sec or more is more preferable. In this regard, in the case where the accelerated water-cooling is performed for a short cooling time of 1 sec or less, in the steel sheet surface layer portion after the cooling, pearlite having a small lamellar spacing or bainite is generated as a second phase, and in the sheet central portion, pearlite having a somewhat large lamellar spacing is generated, so that the above-described predetermined cementite average grain size and distribution in the sheet thickness direction thereof are obtained after the annealing. If the secondary cooling time is more than 1 sec, the temperature distribution in the sheet thickness direction after the cooling becomes uniform easily, and predetermined cementite is not obtained easily. The second cooling time is preferably 0.5 sec or less. These effects are remarkable in the case where the steel sheet is thick, in particular, in the case where the sheet thickness is 3 mm or more. Meanwhile, if the cooling stop temperature is more than 600° C., coarse pearlite is generated after the cooling easily, and predetermined cementite is not obtained after the annealing. On the other hand, if the cooling stop temperature is lower than 500° C., large amounts of hard phases, e.g., bainite and martensite, are generated, and the steel sheet becomes too strong, so that a coil shape during coiling and operability are degraded. In addition, the cementite after the annealing may become excessively fine, so that the formability of the steel sheet may be degraded.

Annealing Temperature: 650° C. or Higher and Lower than or Equal to $Ac_1$ Transformation Point The steel sheet coiled after the secondary cooling is subjected to a treatment, e.g., pickling or shot blasting, to remove scale on the surface layer and then is annealed to facilitate spheroidization of cementite. At this time, if the annealing temperature is lower than 650° C., the spheroidization of cementite do not proceed smoothly, and if the annealing temperature is higher than the $Ac_1$ transformation point, austenite is generated during annealing, and pearlite, that is, cementite not spheroidized, becomes present together after the annealing, so that the formability and the hardenability of the steel sheet are degraded. Therefore, the annealing temperature is limited to within the range of 650° C. or higher and lower than or equal to the $Ac_1$ transformation point, and preferably 680° C. or higher and ($Ac_1$ transformation point −5° C.) or lower.

In the case where the holding time at the annealing temperature is 10 hours or more, the spheroidization of cementite can be almost achieved, and 20 to 40 hours is desirable. The steel sheet after the annealing can be subjected to temper rolling, as necessary, to correct the shape of the steel sheet or adjust the surface quality.

In this regard, the $Ac_1$ transformation point can be determined from, for example, an inflection point on the basis of a measurement of a thermal expansion curve during the heating process from ambient temperature. Alternatively, it is also possible to roughly calculate from the contents of chemical components.

Either a converter or an electric furnace can be employed for melting the high carbon steel used in the present invention. The melted steel is made into a steel slab by continuous casting or blooming after ingot making. The steel slab can undergo improvements, e.g., scarfing, as necessary. The steel slab before the hot rolling may be heated to a temperature at which a predetermined finishing temperature can be ensured in accordance with the capacity of the production equipment. The continuously cast steel slab may be hot-rolled directly or after a short time of heating without being cooled to ambient temperature. Alternatively, it is also possible that the former steel slab is heated by an induction heating apparatus, e.g., a bar heater or an edge heater, midway through the hot rolling.

EXAMPLES

Steel slabs A to M having chemical compositions shown in Table 1, where the remainder was composed of Fe and incidental impurities, were made into hot rolled steel sheets having a sheet thickness of 5.0 mm under the hot rolling condition shown in Table 2. Thereafter, scale on the steel sheet surface layer was removed by pickling, and annealing was performed in a nitrogen atmosphere under the annealing condition also shown in Table 2, so as to obtain Steel sheets 1 to 24. In this regard, the $Ar_3$ transformation point and the $Ac_1$ transformation point shown in the table were determined by calculation from the contents of the chemical components on the basis of the following formulae.

$Ar_3$ transformation point (° C.)=910−203[C]$^{1/2}$+44.7 [Si]−30.0[Mn]−11.0[Cr]+31.5[Mo]−15.2[Ni]

$Ac_1$ transformation point (° C.)=727−29.1[Si]−10.7 [Mn]+16.9[Cr]−16.9[Ni]

Here, [C], [Si], [Mn], [Cr], [Mo], and [Ni] represent contents (percent by mass) of C, Si, Mn, Cr, Mo, and Ni, respectively.

A small piece was taken from each steel sheet, rapid heating to 900° C. was performed by high-frequency induction heating, and water hardening was performed after holding for 1 s, so that a sample after the induction hardening was produced. Subsequently, a sample for microstructure examination was taken from each steel sheet after the annealing, and the fraction of pro-eutectoid ferrite and the average grain sizes (ds, dc) of cementite in a sheet thickness cross-section of the steel sheet were measured. In addition, the Rockwell hardnesses of the sample surface after the annealing and after the induction hardening were measured and the formability and the hardenability were evaluated. In this regard, it was considered that minimum requirements were the hardness HRB after the annealing of 85 or less as for the formability required of the steel sheet used as a machine structural part raw material for the automobile driving system part and the hardness HRC after the induction hardening of 40 or more as for the hardenability.

Here, a sheet thickness cross-section parallel to the steel sheet rolling direction was mirror-polished and was corroded with nital or picral. Thereafter, the microstructure of each of the positions of the surface layer portion, the position at one-eighth of the sheet thickness, the position at one-quarter of the sheet thickness, the position at three-eighths of the sheet thickness, and the sheet thickness central portion was observed with a scanning electron microscope at a magnification of 1,000 to 5,000 times. Then, the fraction of pro-eutectoid ferrite and the average grain sizes of cementite were determined as described below. In this regard, each of the positions of the surface layer portion, the position at one-eighth of the sheet thickness, the position at one-quarter of the sheet thickness, and the position at three-eighths of the sheet thickness was observed with reference to both the surface and the back of the steel sheet.

Fraction of pro-eutectoid ferrite: The area fractions (area ratios) of ferrite substantially not containing cementite in the inside of crystal grain in the whole steel microstructure were determined at the above-described five positions by image analysis on the basis of the observation of the microstructure after the nital corrosion, and an area ratio determined as an arithmetic mean of them was taken as the fraction.

Average grain size of cementite: The grain size of each cementite grain was specified to be a geometric mean value of the major axis and the minor axis of the cementite grain on the basis of the observation of the microstructure after the picral corrosion, and the average grain size was determined as an arithmetic mean value of the geometric mean values of all cementite grains in the observation visual field. At this time, the average grain size dc of the cementite in the region from the position at one-quarter of the sheet thickness to the sheet thickness center in the thickness direction was calculated by using the cementite grains present at the position at one-quarter of the sheet thickness, the position at three-eighths of the sheet thickness, and the sheet thickness central portion. Also, the average grain size ds of the cementite in the region from the surface to the position at one-quarter of the sheet thickness in the thickness direction was calculated by using cementite grains present at the surface layer portion, the position at one-eighth of the sheet thickness, and the position at one-quarter of the sheet thickness.

The results are shown in Table 3. The steel sheets (Steel sheet Nos. 1, 2, 3, 7, 8, 11, 14, 15, 16, and 21) according to the present invention have surface hardnesses in accordance with the C contents after the induction hardening and, therefore, are high carbon steel sheets having excellent induction hardenability. On the other hand, Steel sheet Nos. 4, 5, and 6 are comparative examples. Steel sheet Nos. 4 and 5 have small surface hardnesses after the induction hardening and exhibit poor hardenability and Steel sheet No. 6 has a large surface hardness after the annealing and exhibits poor formability, as compared with Steel sheet No. 3 having the same component composition. Also, as for Steel sheet Nos. 9 and 10, Steel sheet No. 9 has a large surface hardness after the annealing and exhibits poor formability and Steel sheet No. 10 has a small surface hardness after the induction hardening and exhibits poor hardenability as compared with Steel sheet No. 8 having the same component composition. Furthermore, Steel sheet Nos. 12 and 13 have small surface hardnesses after the induction hardening so as to exhibit poor hardenability and have large surface hardnesses after the annealing so as to exhibit poor formability as compared with Steel sheet No. 11 having the same component composition. Steel sheet Nos. 17, 18, and 19 are comparative examples. Steel sheet Nos. 17 and 18 have small surface hardnesses after the induction hardening and exhibit poor hardenability and Steel sheet No. 19 has a large surface hardness after the annealing and exhibits poor formability as compared with Steel sheet No. 16 having the same component composition. Also, Steel sheet No. 20 has a large surface hardness after the annealing and exhibits poor formability and, in addition, has a small surface hardness after the induction hardening and exhibits poor hardenability as compared with Steel sheet No. 16 having the same component composition. Steel sheet No. 22 has a C content smaller than the range according to the present invention and the surface hardness after the induction hardening does not satisfy HRC≥40. Also, Steel sheet No. 23 has a C content larger than the range according to the present invention and the surface hardness after the annealing does not satisfy HRB≤85. Meanwhile, it is clear that Steel sheet No. 24 having an amount of sol. Al larger than the range according to the present invention has small surface hardness after the induction hardening and exhibits poor hardenability as compared with Steel sheet Nos. 3 and Steel sheet No. 8 which have the same level of C contents and which are invention examples.

As described above, the steel sheets according to the present invention have surface hardnesses in accordance with the C contents after the induction hardening and, therefore, are high carbon steel sheets having excellent induction hardenability. On the other hand, the steel sheets according to the comparative examples have large hardnesses after the annealing and, therefore, exhibit poor formability or have small hardnesses after the induction hardening and, therefore, exhibit poor induction hardenability as compared with the steel sheets according to the invention examples having similar chemical compositions.

TABLE 1

(percent by mass)

| Steel slab | C | Si | Mn | P | S | sol.Al | N | Others | Ar₃ transformation point (° C.) | Ac₁ transformation point (° C.) | Remarks |
|---|---|---|---|---|---|---|---|---|---|---|---|
| A | 0.20 | 0.2 | 0.4 | 0.01 | 0.004 | 0.03 | 0.003 | — | 816 | 717 | within the present invention |
| B | 0.20 | 0.1 | 0.2 | 0.01 | 0.005 | 0.02 | 0.003 | Ti:0.02, B:0.003 | 815 | 723 | within the present invention |
| C | 0.34 | 0.2 | 0.8 | 0.02 | 0.007 | 0.01 | 0.002 | — | 777 | 713 | within the present invention |
| D | 0.36 | 0.3 | 0.7 | 0.02 | 0.006 | 0.04 | 0.002 | Cr:0.2 | 779 | 713 | within the present invention |
| E | 0.34 | 0.2 | 0.8 | 0.02 | 0.007 | 0.002 | 0.005 | — | 777 | 713 | within the present invention |
| F | 0.35 | 0.1 | 0.3 | 0.01 | 0.008 | 0.03 | 0.002 | — | 785 | 721 | within the present invention |
| G | 0.36 | 0.3 | 0.6 | 0.02 | 0.008 | 0.03 | 0.002 | Cr:1.0, Mo:0.2, Ni:0.1 | 777 | 727 | within the present invention |
| H | 0.40 | 0.3 | 1.5 | 0.03 | 0.006 | 0.05 | 0.004 | — | 750 | 702 | within the present invention |
| I | 0.45 | 0.2 | 0.7 | 0.02 | 0.005 | 0.003 | 0.005 | — | 762 | 714 | within the present invention |
| J | 0.50 | 0.2 | 0.7 | 0.02 | 0.006 | 0.08 | 0.002 | — | 754 | 714 | within the present invention |
| K | 0.1 | 0.2 | 0.3 | 0.01 | 0.004 | 0.03 | 0.003 | — | 824 | 718 | out of the present invention |
| L | 0.52 | 0.3 | 0.8 | 0.02 | 0.009 | 0.04 | 0.003 | — | 753 | 710 | out of the present invention |
| M | 0.34 | 0.2 | 0.8 | 0.02 | 0.007 | 0.09 | 0.005 | — | 777 | 713 | out of the present invention |

TABLE 2

| | | Hot rolling condition | | | | | | Annealing condition | |
|---|---|---|---|---|---|---|---|---|---|
| Steel sheet | Steel slab | Finishing temperature (° C.) | Average primary cooling rate (° C./sec) | Primary cooling stop temperature (° C.) | Average secondary cooling rate (° C./sec) | Secondary cooling time (sec) | Secondary cooling stop temperature (° C.) | Temperature (° C.) | Time (hr) |
| 1 | A | 880 | 40 | 650 | 240 | 0.4 | 600 | 710 | 40 |
| 2 | B | 880 | 50 | 650 | 240 | 0.5 | 580 | 710 | 40 |
| 3 | C | 860 | 40 | 620 | 180 | 0.5 | 560 | 700 | 30 |

TABLE 2-continued

| | | Hot rolling condition | | | | | | Annealing condition | |
|---|---|---|---|---|---|---|---|---|---|
| Steel sheet | Steel slab | Finishing temperature (° C.) | Average primary cooling rate (° C./sec) | Primary cooling stop temperature (° C.) | Average secondary cooling rate (° C./sec) | Secondary cooling time (sec) | Secondary cooling stop temperature (° C.) | Temperature (° C.) | Time (hr) |
| 4 | C | 760 | 30 | 620 | 180 | 0.5 | 560 | 700 | 30 |
| 5 | C | 780 | 20 | 640 | 180 | 0.4 | 600 | 700 | 30 |
| 6 | C | 860 | 60 | 560 | 180 | 0.5 | 500 | 700 | 30 |
| 7 | D | 860 | 30 | 640 | 120 | 1.0 | 540 | 710 | 20 |
| 8 | E | 860 | 40 | 620 | 180 | 0.5 | 560 | 705 | 25 |
| 9 | E | 860 | 40 | 540 | 180 | 0.3 | 520 | 705 | 25 |
| 10 | E | 860 | 40 | 660 | 180 | 0.6 | 580 | 705 | 25 |
| 11 | F | 860 | 40 | 620 | 180 | 0.7 | 560 | 700 | 25 |
| 12 | F | 860 | 40 | 620 | 180 | 0.7 | 560 | 640 | 40 |
| 13 | F | 860 | 40 | 620 | 180 | 0.7 | 560 | 730 | 10 |
| 14 | G | 840 | 40 | 600 | 150 | 0.8 | 560 | 700 | 35 |
| 15 | H | 840 | 40 | 580 | 150 | 0.4 | 600 | 700 | 25 |
| 16 | I | 840 | 35 | 580 | 150 | 0.5 | 540 | 700 | 30 |
| 17 | I | 840 | 35 | 580 | 100 | 0.5 | 560 | 700 | 30 |
| 18 | I | 840 | 35 | 580 | 120 | 1.2 | 500 | 700 | 30 |
| 19 | I | 840 | 35 | 580 | 150 | 1.0 | 480 | 700 | 30 |
| 20 | I | 840 | 25 | 640 | 150 | 0.5 | 620 | 700 | 30 |
| 21 | J | 820 | 25 | 550 | 120 | 0.6 | 540 | 680 | 20 |
| 22 | K | 880 | 40 | 650 | 240 | 0.4 | 600 | 710 | 40 |
| 23 | L | 820 | 25 | 550 | 120 | 0.6 | 540 | 680 | 20 |
| 24 | M | 860 | 40 | 620 | 180 | 0.5 | 560 | 705 | 25 |

TABLE 3

| | | | Microstructure* | | | | Hardness | | |
|---|---|---|---|---|---|---|---|---|---|
| Steel slab | Steel sheet | Phase | Pro-eutectoid F fraction (%) | ds (μm) | dc (μm) | ds/dc | Surface hardness after annealing (HRB) | Surface hardness after induction hardening (HRC) | Remarks |
| A | 1 | F,C | 48 | 1.2 | 1.5 | 0.80 | 69 | 42 | invention example |
| B | 2 | F,C | 43 | 1.0 | 1.3 | 0.77 | 72 | 44 | invention example |
| C | 3 | F,C | 40 | 0.69 | 0.89 | 0.78 | 77 | 51 | invention example |
| C | 4 | F,C | 56 | 0.92 | 0.87 | 1.06 | 78 | 45 | comparative example |
| C | 5 | F,C | 52 | 0.79 | 0.96 | 0.82 | 77 | 46 | comparative example |
| C | 6 | F,C | 18 | 0.50 | 0.65 | 0.77 | 81 | 52 | comparative example |
| D | 7 | F,C | 37 | 0.57 | 0.76 | 0.75 | 79 | 52 | invention example |
| E | 8 | F,C | 41 | 0.71 | 0.90 | 0.79 | 78 | 52 | invention example |
| E | 9 | F,C | 17 | 0.36 | 0.45 | 0.80 | 82 | 53 | comparative example |
| E | 10 | F,C | 50 | 0.83 | 0.98 | 0.85 | 79 | 48 | comparative example |
| F | 11 | F,C | 44 | 0.73 | 0.93 | 0.78 | 75 | 50 | invention example |
| F | 12 | F,C | 44 | 1.5 | 1.7 | 0.88 | 78 | 45 | comparative example |
| F | 13 | F, P, C | 48 | 2.2 | 2.3 | 0.96 | 79 | 44 | comparative example |
| G | 14 | F,C | 20 | 0.52 | 0.68 | 0.76 | 84 | 53 | invention example |
| H | 15 | F,C | 37 | 0.62 | 0.79 | 0.78 | 83 | 55 | invention example |
| I | 16 | F,C | 33 | 0.60 | 0.76 | 0.79 | 81 | 57 | invention example |
| I | 17 | F,C | 34 | 0.68 | 0.81 | 0.84 | 81 | 53 | comparative example |
| I | 18 | F,C | 32 | 0.63 | 0.69 | 0.91 | 82 | 53 | comparative example |
| I | 19 | F,C | 33 | 0.38 | 0.48 | 0.79 | 88 | 57 | comparative example |
| I | 20 | F, P, C | 33 | 1.4 | 1.6 | 0.88 | 84 | 52 | comparative example |
| J | 21 | F,C | 25 | 0.56 | 0.71 | 0.79 | 83 | 60 | invention example |
| K | 22 | F,C | 51 | 1.2 | 1.6 | 0.75 | 68 | 39 | comparative example |
| L | 23 | F,C | 19 | 0.51 | 0.67 | 0.76 | 86 | 61 | comparative example |
| M | 24 | F,C | 42 | 0.70 | 0.88 | 0.80 | 78 | 47 | comparative example |

*: F ferrite, C cementite, P pearlite

The invention claimed is:

1. A high carbon steel sheet having a chemical composition containing C: 0.20% to 0.50%, Si: 1.0% or less, Mn: 2.0% or less, P: 0.03% or less, S: 0.02% or less, sol.Al: 0.08% or less, N: 0.02% or less, and the remainder composed of Fe and incidental impurities, on a percent by mass basis, and a microstructure composed of ferrite and cementite, wherein the fraction of pro-eutectoid ferrite, among the ferrite, in the whole steel microstructure is 20% or more and less than 50%, the average grain size dc of the cementite in the region from the position at one-quarter of the sheet thickness of the steel sheet to the sheet thickness center is 0.50 to 1.5 μm, and the average grain size ds of the cementite in the region from the surface of the steel sheet to the position at one-quarter of the sheet thickness satisfies ds/dc≤0.8.

2. The high carbon steel sheet according to claim 1, further comprising at least one selected from the group consisting of Cr: 0.1% to 1.5%, Mo: 0.1% to 0.5%, Ni: 0.1% to 1.0%, Ti:

0.01% to 0.05%, Nb: 0.01% to 0.05%, V: 0.01% to 0.05%, and B: 0.0005% to 0.0050% on a percent by mass basis.

3. The high carbon steel sheet according to claim 1, wherein the Si content is 0.1% or more and 0.5% or less.

4. The high carbon steel sheet according to claim 1, wherein the Mn content is 0.2% or more and 1.0% or less.

5. The high carbon steel sheet according to claim 1, wherein the ds/dc is 0.7 or more and 0.8 or less.

6. The high carbon steel sheet according to claim 1, wherein a Rockwell hardness in HRB after annealing is 85 or less.

7. The high carbon steel sheet according to claim 1, wherein a Rockwell hardness in HRC after induction hardening is 40 or more.

* * * * *